(12) United States Patent  
Stama

(10) Patent No.: US 8,464,667 B1  
(45) Date of Patent: Jun. 18, 2013

(54) HYDROGEN SYSTEM FOR INTERNAL COMBUSTION ENGINE

(76) Inventor: Giulio Stama, Miami, FL (US)

( * ) Notice: Subject to any disclaimer, the term of this patent is extended or adjusted under 35 U.S.C. 154(b) by 678 days.

(21) Appl. No.: 12/765,180

(22) Filed: Apr. 22, 2010

(51) Int. Cl.
*F02B 43/08* (2006.01)
*F02B 63/00* (2006.01)

(52) U.S. Cl.
USPC .................................................. 123/3; 123/2

(58) Field of Classification Search
USPC .......................................................... 123/2, 3
See application file for complete search history.

(56) References Cited

U.S. PATENT DOCUMENTS

| | | | |
|---|---|---|---|
| 4,344,831 A * | 8/1982 | Weber | 204/228.5 |
| 4,369,737 A * | 1/1983 | Sanders et al. | 123/3 |
| 5,272,871 A | 12/1993 | Oshima et al. | |
| 6,209,493 B1 * | 4/2001 | Ross | 123/3 |
| 6,336,430 B2 * | 1/2002 | de Souza et al. | 123/3 |
| 6,464,854 B2 | 10/2002 | Andrews et al. | |
| 6,698,389 B2 | 3/2004 | Andrews et al. | |
| 6,790,324 B2 | 9/2004 | Chambers | |
| 6,977,120 B2 | 12/2005 | Chou et al. | |
| 7,240,641 B2 | 7/2007 | Balan et al. | |
| 7,458,368 B1 | 12/2008 | Huffman | |
| 7,459,071 B2 | 12/2008 | Omasa | |
| 7,615,138 B2 * | 11/2009 | Davidson | 204/230.7 |
| 2004/0065542 A1 | 4/2004 | Fairfull et al. | |
| 2005/0217991 A1 * | 10/2005 | Dahlquist, Jr. | 204/267 |
| 2007/0080071 A1 * | 4/2007 | Perry, Jr. | 205/638 |
| 2007/0137590 A1 * | 6/2007 | Vetrovec | 123/25 A |
| 2008/0202942 A1 | 8/2008 | Wilkinson et al. | |
| 2008/0257751 A1 | 10/2008 | Smola et al. | |
| 2009/0320807 A1 * | 12/2009 | Cerny et al. | 123/527 |

* cited by examiner

*Primary Examiner* — Lindsay Low
*Assistant Examiner* — Charles Brauch
(74) *Attorney, Agent, or Firm* — Albert Bordas, P.A.

(57) ABSTRACT

A hydrogen system for diesel and gas engines, comprising a housing assembly containing an aqueous solution. A heating assembly comprises a first inlet, a first outlet, and tubing connecting the first inlet to the first outlet. A hydrogen generator is contained within the housing assembly. It comprises a second inlet and a second outlet, and at least a top wall and a base wall. The top wall is at a predetermined angle to allow the aqueous solution to flow and circulate into a connecting tube. The hydrogen generator comprises negative charged rods and positive charged rods. The hydrogen generator generates hydrogen and oxygen gas for use in an internal combustion engine to improve combustion efficiency and to decrease emissions. The hydrogen generator serves as an electrolysis cell to generate the oxygen and hydrogen gas with electric current from a power source being passed through the aqueous solution.

20 Claims, 5 Drawing Sheets

HYDROGEN SYSTEM FOR INTERNAL COMBUSTION ENGINE

BACKGROUND OF THE INVENTION

1. Field of the Invention

The present invention relates to hydrogen generating devices, and more particularly, to a hydrogen system for diesel and gas engines.

2. Description of the Related Art

Diesel and gas engines are internal combustion engines in which combustion of a fuel occurs with an oxidizer; usually air, in a combustion chamber. In the internal combustion engines, the expansion of high temperature and pressure gases that are produced by combustion, directly apply force to a movable component of the engine, such as pistons or turbine blades to generate useful mechanical energy. The term internal combustion engine often refers to an engine in which combustion is intermittent, such as four-stroke and two-stroke piston engines, along with variants, such as the Wankel rotary engine. A large number of different designs for internal combustion engines have been developed and built, with a variety of different strengths and weaknesses.

While there have been and still are many stationary applications, the real strength of internal combustion engines is in mobile applications and they completely dominate as a power supply for vehicles including automobiles, trucks, sport utility vehicles, and motorcycles; aircraft; and boats. The internal combustion engine is most commonly used for mobile propulsion of the above-mentioned, and generally uses fossil fuel, mainly petroleum for combustion.

However, there is a need to improve engine efficiencies to reduce fossil fuel consumption. Hydrogen gas may be introduced into an engine to improve fuel combustion, resulting in less fossil fuel demand and overall improved engine efficiency.

Electrolysis of water is the decomposition of water ($H_2O$) into oxygen ($O_2$) and hydrogen gas ($H_2$) due to an electric current being passed through the water. Prior art teaches that an electrical power source is connected to two electrodes, or two plates, (typically made from some inert metal such as platinum or stainless steel) which are placed in the water. Hydrogen will appear at the cathode (the negatively charged electrode, where electrons are pumped into the water), and oxygen will appear at the anode (the positively charged electrode). The generated amount of hydrogen is twice the amount of oxygen, and both are proportional to the total electrical charge that was sent through the water. Electrolysis is sped up dramatically by adding an electrolyte (such as a salt, an acid or a base).

Applicant believes that the closest reference to the present invention corresponds to U.S. patent application Ser. No. 12/419,693, filed on Apr. 7, 2009 by Giulio Stama, for a hydrogen system for internal combustion engines. However, it differs from the present invention because Stama teaches a hydrogen system for internal combustion engines, comprising a housing assembly having at least three internal chambers divided by at least two dividing plates. The two dividing plates include a lower dividing plate and an upper dividing plate. Each comprises a plurality of through holes to allow aqueous solution to flow and circulate through the three internal chambers. A hydrogen generator is mounted onto the housing assembly at a predetermined angle. The hydrogen generator comprises a first predetermined number of negative charged plates, a second predetermined number of neutral plates, and a third predetermined number of positive charged plates. The hydrogen generator generates hydrogen and oxygen gas for use in an internal combustion engine to improve combustion efficiency and to decrease emissions. The hydrogen generator serves as an electrolysis cell to generate the oxygen and hydrogen gas with electric current from a power source being passed through the aqueous solution.

Applicant believes that one of the closest references to the present invention corresponds to U.S. Patent Application Publication No. 20080257751, published on Oct. 23, 2008 to Smola, et al. for an enhanced device for generating hydrogen for use in internal combustion engines. However, it differs from the present invention because Smola, et al. teach an electrolysis conversion system for converting water into hydrogen and oxygen, including a housing in which are housed electrodes. The electrodes are immersed in an electrolyte and are connected to positive and negative sides of an energy source. The housing is a non-conductive material that has chambers to separate the hydrogen and the oxygen. Smola, et al. further disclose a method of utilizing an electrolyzer in conjunction with a fuel system of an internal combustion engine to improve the efficiency of internal combustion engines.

Applicant believes that another reference corresponds to U.S. Patent Application Publication No. 20080202942, published on Aug. 28, 2008 to Wilkinson, et al. for a method and apparatus for converting water into hydrogen and oxygen for a heat and/or fuel source. However, it differs from the present invention because Wilkinson, et al. teach a water separation apparatus to separate hydrogen and oxygen from water that includes a reaction chamber containing a plurality of spaced apart conductive plates, a positive electrical terminal electrically connected to one of the conductive plates, and a negative electrical terminal electrically connected to another of the conductive plates. A mixture of water and a catalyst is placed in the chamber and in contact with the plates. A non-conductive adjuster plate is provided to separate the chamber into a front chamber and a rear chamber, and may include at least one fluid passageway. A portion of the plates is disposed in the front chamber and a portion of the plates is disposed in the rear chamber. The adjuster plate may include a moveable member adapted to adjust the cross-sectional area of fluid passageway and thus the cross-sectional area of fluid communication between the front and rear chambers. The apparatus may include a collector-separator to collect gases from the reaction chamber and separate any remaining water from the gases. The separated water is returned to the reaction chamber, and the hydrogen and oxygen gases are transmitted to a bubbler assembly which functions to prevent any flashback from igniting the gases in the reaction chamber or collector-separator.

Applicant believes that another reference corresponds to U.S. Patent Application Publication No. 20050217991, published on Oct. 6, 2005 to Dahlquist, Jr. for a fuel system for internal combustion engine. However, it differs from the present invention because Dahlquist, Jr. teaches a fuel system for generating hydrogen and oxygen for use in an internal combustion engine to improve combustion efficiency, horsepower, and torque; and to decrease emissions. The fuel system has at least one electrolysis cell for generating hydrogen and oxygen by electrolysis of an aqueous solution, a power source for providing electrical power to the electrolysis cell, and a heating and cooling system for maintaining the temperature of the electrolysis cell in a desired range to obtain the desired quantities of hydrogen and oxygen for operation of the internal combustion engine. The invention also includes an electrode array of a plurality of spaced apart electrodes for use in this fuel system and a nonconductive support connected to each of the electrodes to hold the electrodes in place, while leaving adequate room around the electrodes to allow free flow of the aqueous solution between the electrodes. High purity electrolyte and substantially non-reactive electrodes result in improved electrolysis.

Applicant believes that another reference corresponds to U.S. Patent Application Publication No. 20040065542, published on Apr. 8, 2004 to Fairfull, et al. for a hydrogen generator. However, it differs from the present invention because Fairfull, et al. teach a hydrogen generator for supplying hydrogen and/or oxygen to an internal combustion engine. A generator comprises a housing, and a base unit is secured within the housing. The base unit has integral therewith first mounting means for an electrolytic cell, second mounting means for a replaceable liquid reservoir, and a conduit between the first and second mounting means. An electrolytic cell is mounted in the first mounting means. The cell has a liquid inlet and a gas outlet, and connectors for electrical connection to an external source of energy. A controller unit is connected to the cell and comprises a central processing unit and a series of sensors for sensing pressure, temperature and liquid level in the cell. The controller controls operation of the cell responsive to sensor output.

Applicant believes that another reference corresponds to U.S. Pat. No. 7,459,071 issued to Omasa on Dec. 2, 2008 for a hydrogen-oxygen gas generator and method of generating hydrogen-oxygen gas using the generator. However, it differs from the present invention because Omasa teaches a hydrogen-oxygen gas generator comprising an electrolytic cell. An electrode group is formed from an anode and a cathode mutually installed in that electrolytic cell. A power supply applies a voltage across the anode and cathode, and gas trapping means collect the hydrogen-oxygen gas generated by electrolyzing the electrolyte fluid. In addition, there are vibration-stirring means. The gas trapping means is comprised of a lid member installed on the electrolytic cell, a hydrogen-gas extraction tube connecting to the hydrogen-oxygen gas extraction outlet of that lid member. The vibration-stirring means is for stirring and agitating the electrolytic fluid supported by support tables. The distance between the adjacent positive electrode and negative electrode within the electrode group is set within a range of 1 to 20 millimeters. The vibration-stirring means is comprised of vibrating motors vibrating at 10 to 200 Hertz, and vibrating blades vibrating within the electrolytic cell and unable to rotate are attached to a vibrating rod linked to the vibrating motors.

Applicant believes that another reference corresponds to U.S. Pat. No. 7,458,368 issued to Huffman on Dec. 2, 2008 for engine fuel efficiency improvements. However, it differs from the present invention because Huffman teaches a system for increasing the fuel efficiency of a vehicle of the type having an internal combustion engine, a battery, a vacuum line, and a fuel line that feeds fuel to the engine. The system comprises a hydrogen gas generator and a vacuum regulator. A vacuum regulator is in fluid communication with the vacuum line of the vehicle and an output line of the gas generator. The vacuum regulator includes a vacuum pressure adjustment means for controlling the amount of hydrogen gas that is introduced into the vacuum line of the vehicle. In use, hydrogen gas is introduced into the vehicle vacuum line and then into the engine where it is mixed with the fuel from the fuel line and ambient air. The hydrogen gas increases the atomization of the fuel for more efficient burning thereof in the engine. A fuel additive including an acetone-based compound, a xylene-based compound, and an upper cylinder lubricant may be mixed with the hydrogen gas to further atomize the fuel. An oxygen sensor signal generator that generates a bypass signal replicates the output of a vehicle oxygen sensor under normal operating conductions to keep the air mixture of the engine unaffected. The system may additional include at least one fuel heating means fixed to a high-temperature portion of the engine, such that the fuel is heated before being introduced into the engine so as to further increase atomization of the fuel for more efficient burning thereof in the engine. Applicant believes that another reference corresponds to U.S. Pat. No. 7,240,641 issued to Balan, et al. on Jul. 10, 2007 for hydrogen generating apparatus and components therefor. However, it differs from the present invention because Balan, et al. teach a hydrogen generating system for use in internal combustion engines for increasing the efficiency of the engine and decreasing emissions from the engine. The hydrogen generating system has an electrolysis cell for generating hydrogen and oxygen gases by electrolysis of an aqueous solution, a power source for providing electrical power to the electrolysis cell, an outlet flow means for introducing the generated gases into the intake manifold system of an internal combustion engine, a monitoring means for monitoring the operating conditions of the hydrogen generating system, and a control means connected to the monitoring means for controlling the operation of the hydrogen generating system in response to the monitoring means.

Applicant believes that another reference corresponds to U.S. Pat. No. 6,977,120 issued to Chou, et al. on Dec. 20, 2005 for a hydrogen/oxygen generating system with temperature control. However, it differs from the present invention because Chou, et al. teach a mixed hydrogen-oxygen fuel generator system using an electrolytic solution to generate gaseous hydrogen-oxygen fuel through the electrolysis of water. This generator system includes: at least one electrolytic cell with multiple metallic plates used as an internal isolation system in which two of the plates separately connect to both the positive and negative terminal of a DC circuit. These plates are used for the electrolysis of the electrolytic solution in the cell(s) to produce, under pressure, mixed hydrogen-oxygen fuel. The apparatus also includes a cooling system containing a water cooling tank in which there are two zones: one is the electrolytic solution circulation coil and the another is a water circulation zone. The cooler provides the circulating, cooling water used to adjust the temperature of the operating cell and of the electrolyte solution to within a given temperature range in order to ensure that the cell is not affected by excessively elevated temperatures that can stop operations due to cell overheating. Another effect of this cooling system is to precipitate moisture out of the generated gas products. The ignition flame temperature of the gaseous fuel produced can be adjusted for specific applications by passage of the hydrogen/oxygen gas stream through a temperature-control fluid. Thus, continuous 24-hour operation can be achieved along with better gas production efficiency and fuel cell energy generation.

Applicant believes that another reference corresponds to U.S. Pat. No. 6,790,324 issued to Chambers on Sep. 14, 2004 for a hydrogen producing apparatus. However, it differs from the present invention because Chambers teaches an apparatus for producing orthohydrogen and/or parahydrogen. The apparatus includes a container holding water and at least one pair of closely-spaced electrodes arranged within the container and submerged in the water. A first power supply provides a particular first pulsed signal to the electrodes. A coil may also be arranged within the container and submerged in the water if the production of parahydrogen is also required. A second power supply provides a second pulsed signal to the coil through a switch to apply energy to the water. When the second power supply is disconnected from the coil by the switch and only the electrodes receive a pulsed signal, then orthohydrogen can be produced. When the second power supply is connected to the coil and both the electrodes and coil receive pulsed signals, then the first and second pulsed signals can be controlled to produce parahydrogen. The container is self-pressurized and the water within the container requires no chemical catalyst to efficiently produce the orthohydrogen and/or parahydrogen. Heat is not generated, and bubbles do not form on the electrodes.

Applicant believes that another reference corresponds to U.S. Pat. No. 6,698,389 issued to Andrews, et al. on Mar. 2, 2004 for an electrolyzer for internal combustion engine. However, it differs from the present invention because Andrews, et al. teach a method and apparatus for chemically heating one or more components of, or intake air flowing to, an internal combustion engine by feeding hydrogen to a catalyst. Condensation of fuels on cold engine cylinder walls during and after cold start-ups is prevented, thereby reducing wear on the engine. A method and apparatus reduces pollutants commonly occurring during cold start-up of combustion engines by heating components of, or intake air flowing to, a combustion engine, in order to quickly warm the engine and its catalytic converter to operating temperatures. Preferably, the hydrogen is supplied from an electrolyzer or other on-board source of hydrogen and the hydrogen and a source of oxygen are provided to the catalyst resulting in exothermic oxidation of hydrogen to heat the air intake or other components of the engine. Preheating systems for one or more of the air intake, the fuel, the engine oil, the block, the battery and the catalytic converter are also included. Applicant believes that another reference corresponds to U.S. Pat. No. 6,464,854 issued to Andrews, et al. on Oct. 15, 2002 for water sources for automotive electrolyzers. However, it differs from the present invention because Andrews, et al. teach a self-replenishing liquid water source onboard an automobile for supplying liquid water to an electrolyzer, such as an on-board hydrogen generator useful for the suppression of unwanted emissions. Passive means of water collection for reliable replenishment occur with operations of the automobile itself. Condensation from the engine exhaust-gas occurs by cooling a region of the exhaust system using cooling fluid from the engine coolant system. The cooling fluid is circulated during a period following the engine cold start event when the heat load on the engine coolant system is low.

Applicant believes that another reference corresponds to U.S. Pat. No. 6,336,430 issued to de Souza, et al. on Jan. 8, 2002 for a hydrogen generating apparatus. However, it differs from the present invention because de Souza, et al. teach a hydrogen generating system for use in internal combustion engines for increasing the efficiency of the engine and decreasing emissions from the engine. The hydrogen generating system has an electrolysis cell for generating hydrogen and oxygen gases by electrolysis of an aqueous solution, a power source for providing electrical power to the electrolysis cell, an outlet flow means for introducing the generated gases into the intake manifold system of an internal combustion engine, a monitoring means for monitoring the operating conditions of the hydrogen generating system, and a control means connected to the monitoring means for controlling the operation of the hydrogen generating system in response to the monitoring means. A controller controls a hydrogen generating system for use in an internal combustion engine for increasing the efficiency of the engine and decreasing emissions from the engine. The controller has at least one interface means for receiving information on the operating conditions of the hydrogen generating system, at least one control means for controlling a parameter of the hydrogen generating system, and a logic circuit connected to the interface means and control means for providing instructions to the control means in response to the information received from the interface means.

Applicant believes that another reference corresponds to U.S. Pat. No. 5,272,871 issued to Oshima, et al. on Dec. 28, 1993 for a method and apparatus for reducing nitrogen oxides from internal combustion engine. However, it differs from the present invention because Oshima, et al. teach hydrogen gas from a hydrogen generator, which creates hydrogen gas by the electrolysis of water or water vapor, at the entrance to a catalyzer provided in an exhaust line. The catalyzer performs a catalytic reaction between hydrogen gas and nitrogen oxides to achieve decomposition into nitrogen gas and water vapor in the exhaust from an internal combustion engine. The nitrogen oxides are directly reduced with said hydrogen gas in a low temperature atmosphere not higher than 350 degrees Centigrade to achieve efficient reduction in the nitrogen oxides. Nitrogen oxides in the exhaust from a lean burnt engine or a diesel engine can be effectively reduced irrespective of the concentration of oxygen gas in the exhaust without impairing the good fuel economy of those engines.

Other patents describing the closest subject matter provide for a number of more or less complicated features that fail to solve the problem in an efficient and economical way. None of these patents suggest the novel features of the present invention.

SUMMARY OF THE INVENTION

The instant invention is a hydrogen system for diesel and gas engines, comprising a housing assembly containing an aqueous solution. A heating assembly comprises a first inlet, a first outlet, and tubing connecting the first inlet to the first outlet. The tubing extends within the housing assembly and contains matter to heat the aqueous solution within the housing assembly.

A hydrogen generator is contained within the housing assembly. The hydrogen generator comprises a second inlet and a second outlet. The hydrogen generator also comprises at least a top wall and a base wall. The top wall is at a predetermined angle to allow the aqueous solution to flow and circulate into a connecting tube. The hydrogen generator comprises a first predetermined number of negative charged rods, and a second predetermined number of positive charged rods. The hydrogen generator generates hydrogen and oxygen gas for use in an internal combustion engine to improve combustion efficiency and to decrease emissions. The hydrogen generator serves as an electrolysis cell to generate the oxygen and hydrogen gas with electric current from a power source being passed through the aqueous solution. A hydrogen separator comprises a cylindrical section with an outlet tube, and a frustro-conical section. A cone assembly is suspended within the cylindrical section.

The cone assembly comprises a solid section and a perforated section. The solid section causes the hydrogen and oxygen gas to flow through the perforated section towards the outlet tube as it circulates upwardly within the cylindrical section. A water pump assembly has a water pump to fill the housing assembly with a predetermined quantity of the aqueous solution. A bubbler assembly is exteriorly mounted from the housing assembly and connects to the internal combustion engine.

A cylindrical assembly comprises at least one elongated tube. The cylindrical assembly is at least partially made of foam. The first inlet and the first outlet are mounted to the housing assembly. The cylindrical section is positioned exteriorly of the housing assembly and the frustro-conical section is positioned interiorly within the housing assembly. At least one connecting tube extends from the hydrogen generator to the frustro-conical section.

It is therefore one of the main objects of the present invention to provide a hydrogen system for diesel and gas engines that increases the atomization of fuel with hydrogen gas for more efficient burning thereof in the engine.

It is another object of this invention to provide a hydrogen system for diesel and gas engines that reduces carbon build-up.

It is another object of this invention to provide a hydrogen system for diesel and gas engines that reduces polluting carbon emissions as result of the combustion process.

It is another object of this invention to provide a hydrogen system for diesel and gas engines that can be installed onto existing combustion engines in vehicles, as well as new combustion engines.

It is another object of this invention to provide a hydrogen system for diesel and gas engines that is volumetrically efficient.

It is yet another object of this invention to provide such a system that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
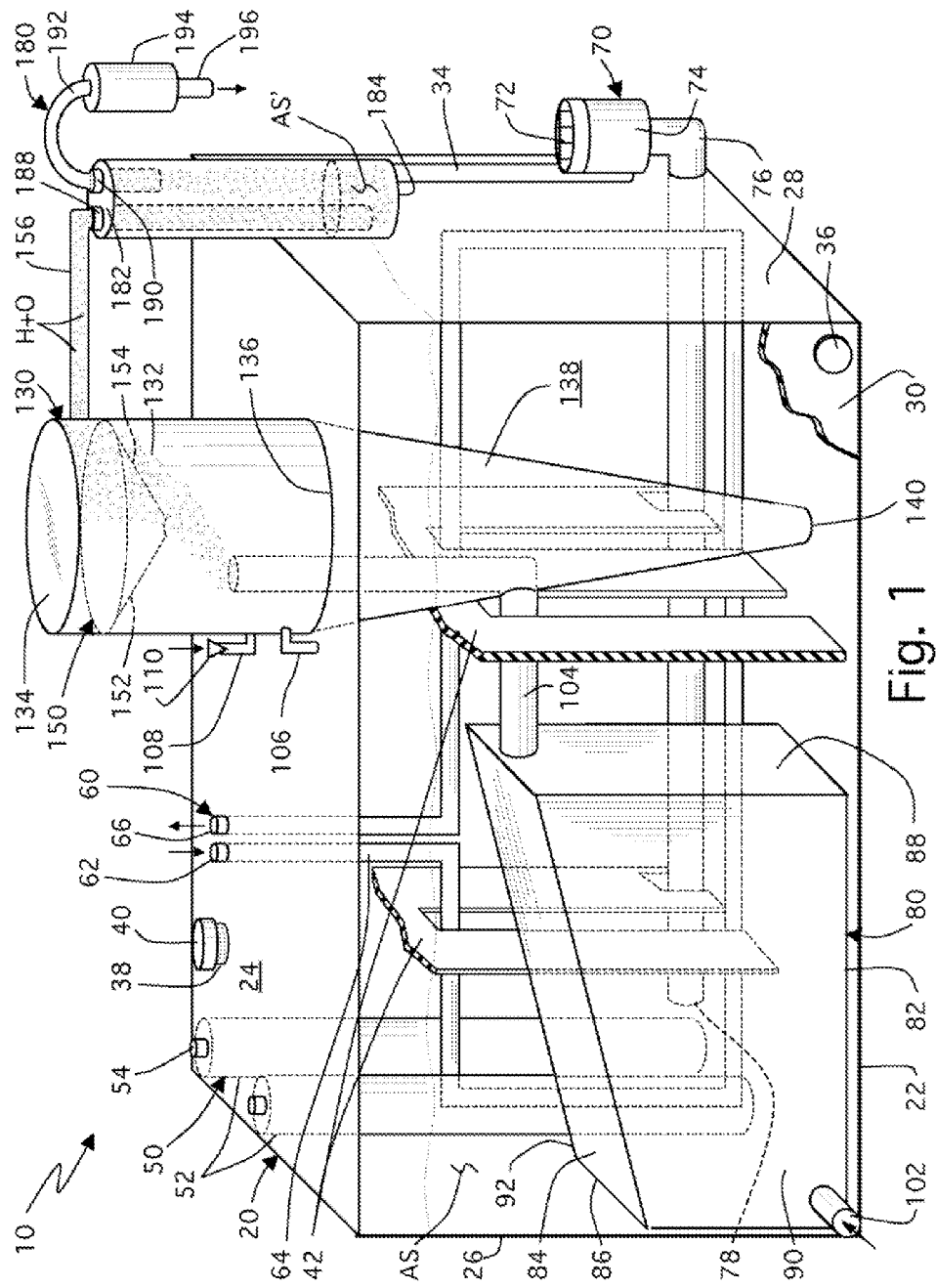
FIG. 1 represents an isometric view of a hydrogen system for diesel and gas engines, object of the present application.

Referring now to the drawings, the present invention is generally referred to with numeral 10. It can be observed that it basically includes housing assembly 20, heating assembly 60, hydrogen generator 80, hydrogen separator 130, and cone assembly 150.

Figure 2:
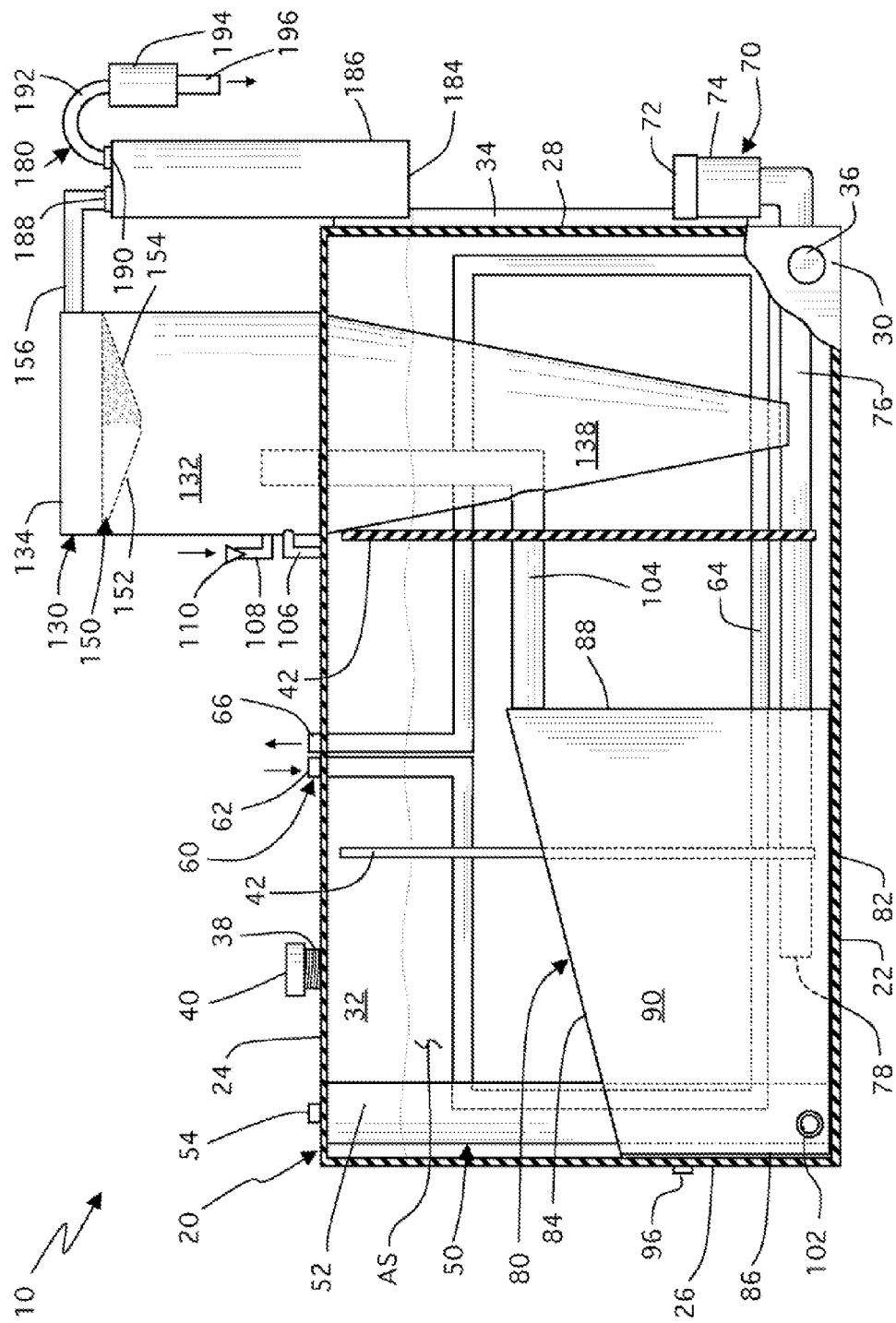
FIG. 2 is a front elevational view of the present invention, where the front wall of the housing assembly has been partially removed to show the disposition of the internal parts.

As seen in FIGS. 1 and 2, housing assembly 20 contains aqueous solution AS. Housing assembly 20 has a substantially rectangular shape comprising base wall 22, top wall 24, lateral walls 26 and 28, front wall 30 (partially represented), and rear wall 32 seen in FIG. 2. Housing assembly 20 also comprises sight tube 34 that is exteriorly mounted to lateral wall 28. Drain cap 36 caps a drain located at a lowermost section of housing assembly 20, such as front wall 30. Top wall 24 comprises intake neck 38 having removable cap 40 fixed thereon to refill housing assembly with aqueous solution AS when needed. Internally mounted within housing assembly 20 are spacer walls 42 that are perpendicularly disposed to lateral walls 26 and 28. Spacer walls 42 have holes and/or cutouts to allow access and/or space for the various components of present invention 10.

Cylindrical assembly 50 comprises tubes 52 housed inside housing assembly 20. In a preferred embodiment, tubes 52 rest on base wall 22 and are secured to top wall 24 with fastening means 54. Such fastening means 54 can be nuts for example. In a preferred embodiment, each tube 52 is at least partially made of foam. In some cases during extremely cold weather conditions, aqueous solution AS may freeze. In such an event, tubes 52 serve to compress as freezing occurs to protect housing assembly 20 from expanding and becoming damaged.

Heating assembly 60 comprises inlet 62 and outlet 66 that are connected by tubing 64. Tubing 64 extends within housing assembly 20 and contains matter to heat aqueous solution AS within housing assembly 20 when aqueous solution AS reaches a predetermined temperature. In a preferred embodiment, heating assembly 60 is connected to a respective vehicle heating system having a switch. Therefore, the matter circulating through heating assembly 60 is the same used for the respective vehicle heating system. Such matter can be heated air or a liquid for example.

Water pump assembly 70 comprises water pump 74. Water pump 74 functions to fill hydrogen generator 80 with a predetermined quantity of aqueous solution AS taken from housing assembly 20. Tubing 76 having open end 78 extends from water pump assembly 70. Open end 78 is disposed a predetermined distance inside housing assembly 20. Filter 72 is mounted adjacent to or onto water pump 74 to filter aqueous solution AS before it is delivered to hydrogen generator 80.

Hydrogen generator 80 is housed within housing assembly 20. Hydrogen generator 80 comprises inlet 102 and outlet connecting tube 104. Hydrogen generator 80 generates hydrogen and oxygen gas H+O for use in internal combustion engine 250, seen in FIG. 5, to improve combustion efficiency and to decrease emissions. Hydrogen generator 80 serves as an electrolysis cell to generate hydrogen and oxygen gas H+O with electric current from a power source being passed through aqueous solution AS. Hydrogen generator 80 comprises at least base wall 82, top wall 84, lateral walls 86 and 88, front wall 90 and rear wall 92. Base wall 82 is fixed to base wall 22. Top wall 84 is disposed at an angle with respect to a horizontal plane whereby lateral wall 88 is taller than lateral wall 86. This allows generated hydrogen and oxygen gas H+O, being buoyant, to flow and circulate into outlet connecting tube 104. In a preferred embodiment, front wall 90 is parallel and substantially close to front wall 30 and lateral wall 86 is parallel and substantially close to lateral wall 26.

Hydrogen separator 130 comprises cylindrical section 132 and frustro-conical section 138. Cylindrical section 132 is positioned exteriorly of housing assembly 20 and frustro-conical section 138 is positioned interiorly within said housing assembly 20. Cylindrical section 132 comprises top plate 134, base edge 136 and outlet tube 156 disposed at a predetermined distance from top plate 134. Cone assembly 150 is suspended within cylindrical section 132 and comprises solid section 152 and perforated section 154. The solid/perforated configuration of cone assembly 150 causes hydrogen and oxygen gas H+O to flow towards and into outlet tube 156 as it circulates upwardly in cylindrical section 132 and through perforated section 154. Inlet tube 108 with check valve 110 permits the entrance of air to enhance the flowing of hydrogen and oxygen gas H+O into outlet tube 156. Vacuum equalizer tube 106 connects cylindrical section 132 with housing assembly 20. Outlet connecting tube 104 extends from hydrogen generator 80 to frustro-conical section 138 and extends upwardly to a predetermined distance inside cylindrical section 132.

Frustro-conical section 138 has open end 140 at a predetermined distance from base wall 22. In a preferred embodiment, only hydrogen and oxygen gas H+O exits hydrogen generator 80 through outlet connecting tube 104. However, if any aqueous solution AS happens to exit hydrogen generator 80 through outlet connecting tube 104, it will fall through open end 140 and return to the rest of aqueous solution AS.

Bubbler assembly 180 is exteriorly mounted from housing assembly 20. Bubbler assembly 180 enhances hydrogen and oxygen gas H+O flowing to internal combustion engine 250, seen in FIG. 5. Bubbler assembly 180 is connected to outlet tube 156 at inlet 188 and comprises top plate 182, base 184, sidewall 186, outlet 190, and outlet connecting tube 192. Bubbler assembly 180 is partially filled with aqueous solution AS'. A distal end of outlet tube 156 extends inside bubbler assembly 180 and is at a predetermined distance from base 184. Compressor 194 is connected to outlet connecting tube 192 and has connecting tube 196.

Figure 3:
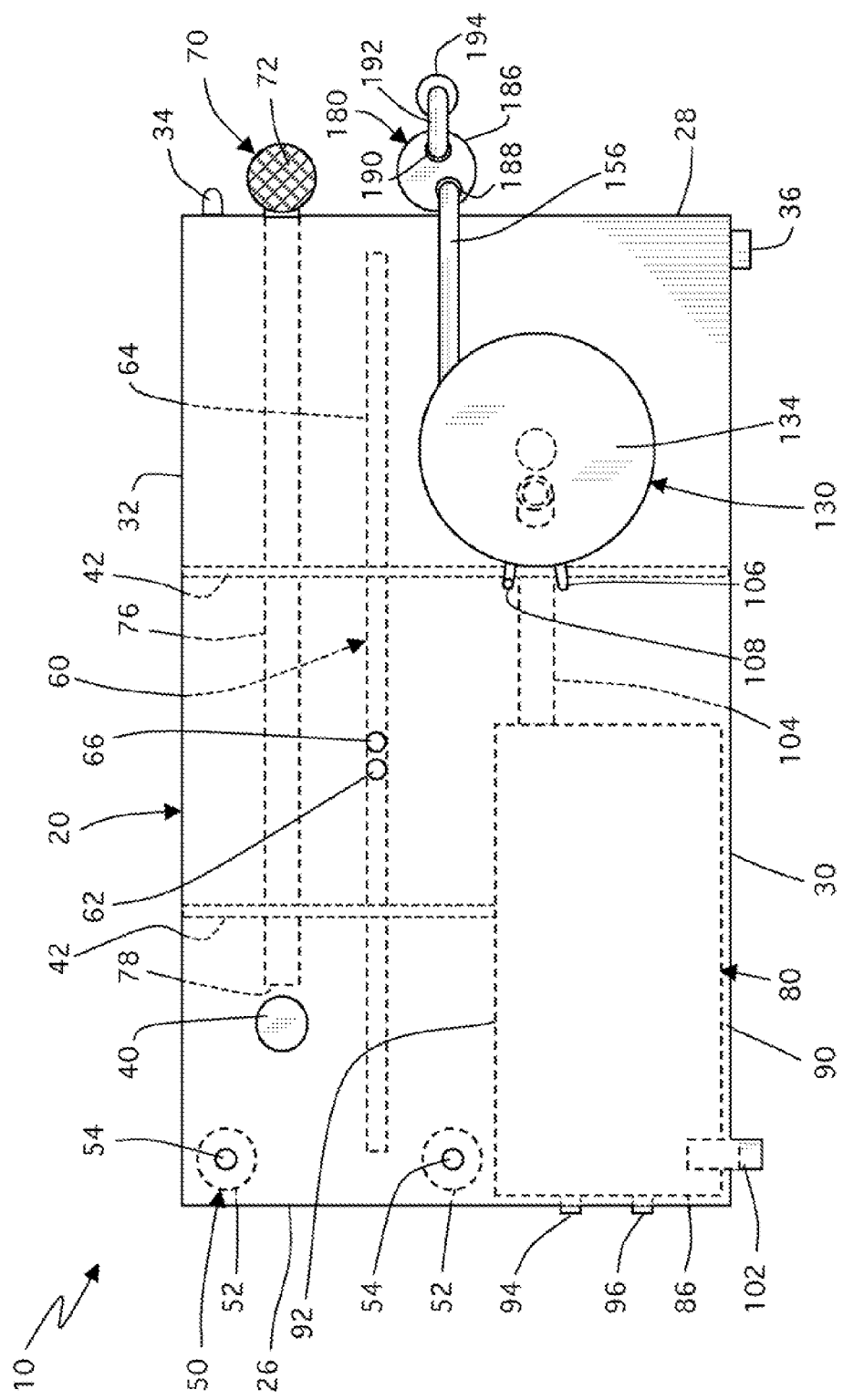
FIG. 3 is a top plan view of the present invention.

As best seen in FIG. 3, spacer walls 42 are mounted onto rear wall 32, and depending of their disposition, to front wall 30 or rear wall 92. Spacer walls 42 reduce aqueous solution AS momentum resulting from sudden movements of a vehicle powered by internal combustion engine 250, seen in FIG. 5. Such sudden movements may occur when rapidly accelerating or decelerating.

Figure 4:
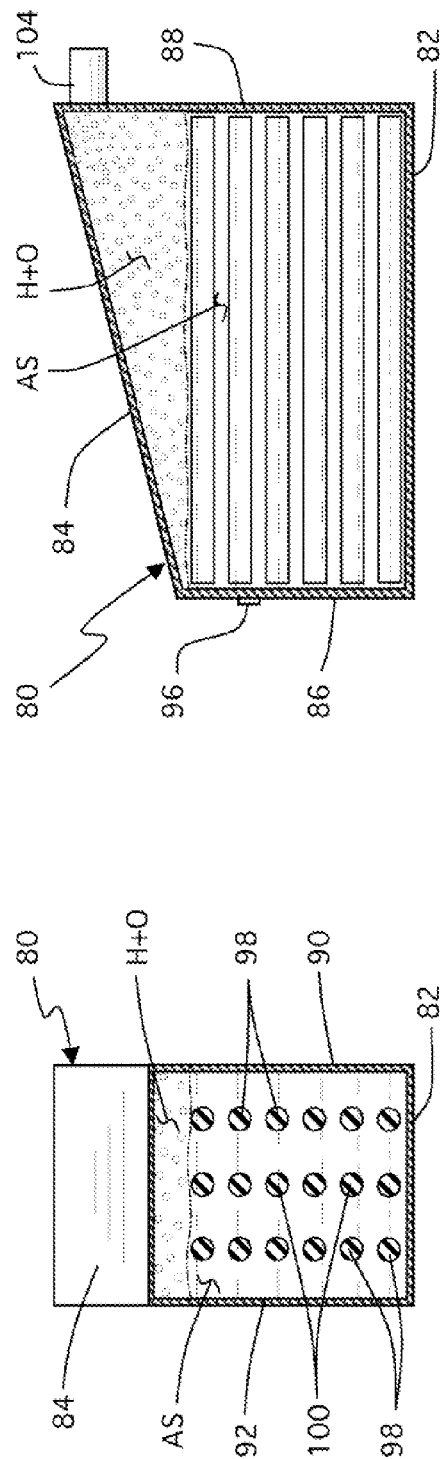
FIG. 4A is a side view of one of the preferred embodiments for an hydrogen generator, where one of its sidewalls has been removed to show the internal components.
FIG. 4B is a front view of the embodiment shown in FIG. 4A for hydrogen generator, where its front wall has been removed to show the internal components.
FIG. 4C is a top view of the embodiment shown in FIG. 4A for the hydrogen generator, where its top wall has been removed to show the disposition of the plates.

As described above, hydrogen generator 80 serves as an electrolysis cell to generate hydrogen and oxygen gas H+O with electric current from a power source being passed through aqueous solution AS. As seen in FIGS. 4A, 4B and 4C, such a power source may include twelve negative charged rods 98 and six positive charged rods 100 disposed in one column of six positive charged rods 100 in-between two columns of six negative charged rods 98 each. Hydrogen generator 80 further comprises leads 94 and 96, and a predetermined number of the negative charged rods 98, and a predetermined number of the positive charged rods 100.

Figure 5:
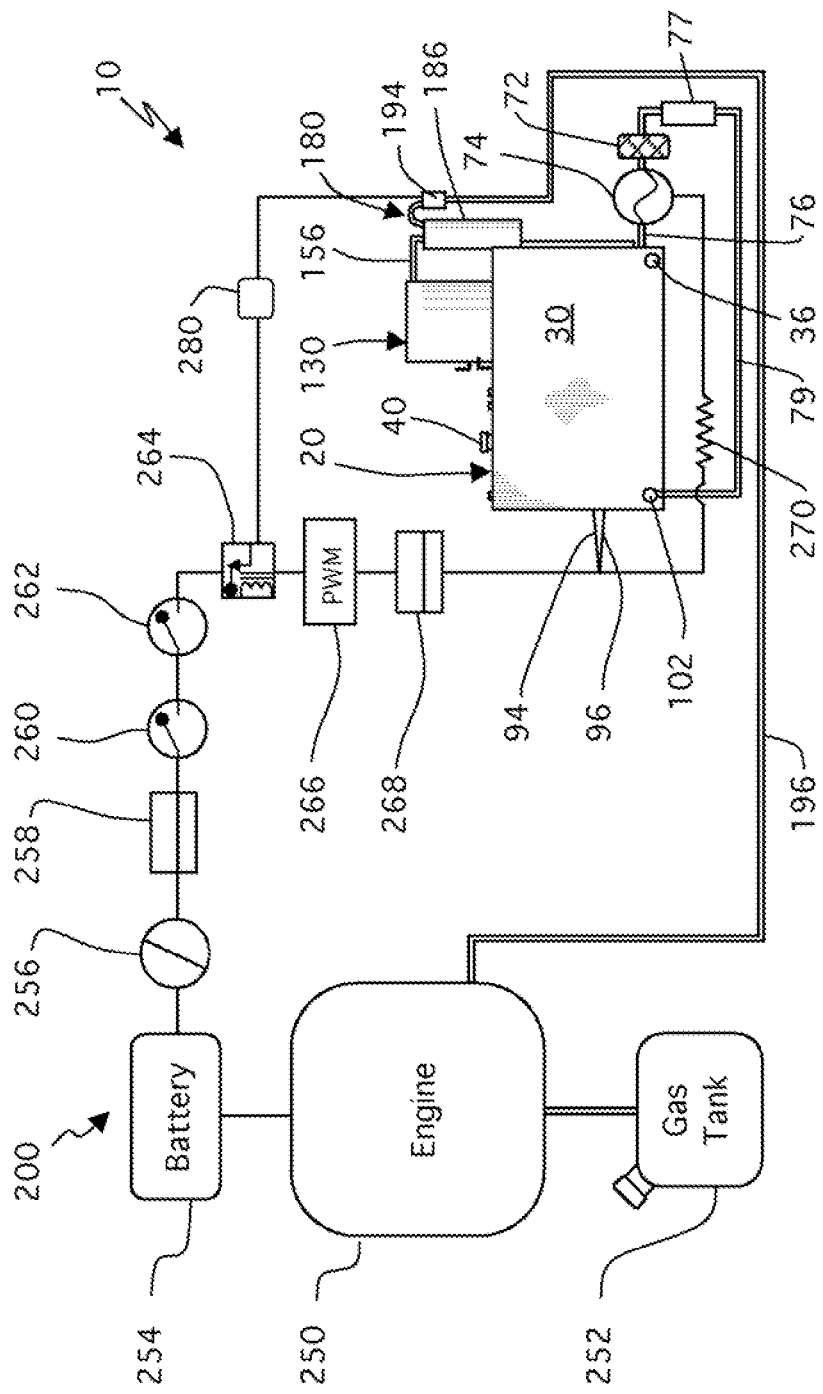
FIG. 5 is a block diagram of the present invention installed onto a vehicle having an internal combustion engine.

As seen in FIG. 5, bubbler assembly 180 connects to internal combustion engine 250. Compressor 194, with connecting tube 196, supplies hydrogen and oxygen gas H+O to internal combustion engine 250. Internal combustion engine 250 also obtains fuel from gas tank 252.

Electrical system 200 battery 254 and ignition key 256 to activate electrical system 200. Electrical system 200 also comprises fuse 258, switch 260, and thermo security switch 262. In addition, relay 264 controls ampere regulator 266 and compressor 194. Fuse 268 is connected next to ampere regulator 266, then to leads 94 and 96 and to water pump 74. Resistor 270 can be connected in between fuse 268 and water pump 74, at a point after the connection with leads 94 and 96. Throttle position sensor 280, between relay 264 and compressor 194, controls the entrance of hydrogen and oxygen gas H+O to compressor 194. In this way, that hydrogen and oxygen gas H+O will be supplied to compressor 194 when the vehicle is accelerated only. Radiator 77 is connected to tubing 79 between filter 72 and inlet 102 of hydrogen generator 80. Radiator 77 cools aqueous solution AS before entering into hydrogen generator 80, thus avoiding water vapor that may compromise the hydrogen and oxygen gas H+O.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A hydrogen system for diesel and gas engines, comprising:
    A) a housing assembly containing an aqueous solution;
    B) a heating assembly comprising a first inlet, a first outlet, and tubing connecting said first inlet to said first outlet;
    C) a hydrogen generator contained within said housing assembly, said hydrogen generator comprising a second inlet and a second outlet, said hydrogen generator generates hydrogen and oxygen gas for use in an internal combustion engine to improve combustion efficiency and to decrease emissions, said hydrogen generator serves as an electrolysis cell to generate said oxygen and hydrogen gas with electric current from a power source being passed through said aqueous solution;
    D) a hydrogen separator comprising a cylindrical section and a frustro-conical section; and
    E) a cone assembly suspended within said cylindrical section.

2. The hydrogen system for diesel and gas engines set forth in claim 1, further characterized in that said cone assembly comprises a solid section and a perforated section.

3. The hydrogen system for diesel and gas engines set forth in claim 2, further characterized in that said cylindrical section comprises an outlet tube and said solid section causes said hydrogen and oxygen gas to flow through said perforated section towards said outlet tube.

4. The hydrogen system for diesel and gas engines set forth in claim 1, further comprising a water pump assembly having a water pump to fill said hydrogen generator with a predetermined quantity of said aqueous solution taken from said housing assembly.

5. The hydrogen system for diesel and gas engines set forth in claim 1, further comprising a bubbler assembly exteriorly mounted from said housing assembly that connects to said internal combustion engine.

6. The hydrogen system for diesel and gas engines set forth in claim 1, further comprising a cylindrical assembly comprising at least one elongated tube.

7. The hydrogen system for diesel and gas engines set forth in claim 6, further characterized in that said cylindrical assembly is at least partially made of foam.

8. The hydrogen system for diesel and gas engines set forth in claim 1, further characterized in that said first inlet and said first outlet are mounted to said housing assembly.

9. The hydrogen system for diesel and gas engines set forth in claim 1, further characterized in that said cylindrical section is positioned exteriorly of said housing assembly.

10. The hydrogen system for diesel and gas engines set forth in claim 1, further characterized in that said frustro-conical section is positioned interiorly within said housing assembly.

11. The hydrogen system for diesel and gas engines set forth in claim 1, further characterized in that at least one connecting tube extends from said hydrogen generator to said frustro-conical section.

12. The hydrogen system for diesel and gas engines set forth in claim 7, further characterized in that said hydrogen generator comprises at least a top wall and a base wall, said top wall is at a predetermined angle to allow said hydrogen and oxygen gas to flow and circulate into said at least one connecting tube.

13. The hydrogen system for diesel and gas engines set forth in claim 1, further characterized in that said hydrogen generator comprises a first predetermined number of negative charged rods, and a second predetermined number of positive charged rods.

14. The hydrogen system for diesel and gas engines set forth in claim 1, further characterized in that said tubing extends within said housing assembly and contains matter to heat said aqueous solution within said housing assembly.

15. A hydrogen system for diesel and gas engines, comprising:
  A) a housing assembly containing an aqueous solution;
  B) a heating assembly comprising a first inlet, a first outlet, and tubing connecting said first inlet to said first outlet, said first inlet and said first outlet are mounted to said housing assembly, said tubing extends within said housing assembly and contains matter to heat said aqueous solution within said housing assembly;
  C) a hydrogen generator contained within said housing assembly, said hydrogen generator comprising a second inlet and a second outlet, said hydrogen generator comprises a first predetermined number of negative charged rods, and a second predetermined number of positive charged rods, said hydrogen generator generates hydrogen and oxygen gas for use in an internal combustion engine to improve combustion efficiency and to decrease emissions, said hydrogen generator serves as an electrolysis cell to generate said oxygen and hydrogen gas with electric current from a power source being passed through said aqueous solution;
  D) a hydrogen separator comprising a cylindrical section and a frustro-conical section, at least one connecting tube extends from said hydrogen generator to said frustro-conical section; and
  E) a cone assembly suspended within said cylindrical section comprises and an outlet tube, and said cone assembly comprises a solid section and a perforated section, said solid section causes said hydrogen and oxygen gas to flow through said perforated section towards said outlet tube.

16. The hydrogen system for diesel and gas engines set forth in claim 15, further comprising a water pump assembly having a water pump to fill said hydrogen generator with a predetermined quantity of said aqueous solution taken from said housing assembly.

17. The hydrogen system for diesel and gas engines set forth in claim 15, further comprising a bubbler assembly exteriorly mounted from said housing assembly that connects to said internal combustion engine.

18. The hydrogen system for diesel and gas engines set forth in claim 15, further comprising a cylindrical assembly comprising at least one elongated tube.

19. The hydrogen system for diesel and gas engines set forth in claim 15, further characterized in that said cylindrical assembly is at least partially made of foam.

20. The hydrogen system for diesel and gas engines set forth in claim 15, further characterized in that said cylindrical section is positioned exteriorly of said housing assembly and said frustro-conical section is positioned interiorly within said housing assembly.

* * * * *